(12) United States Patent
Abraham et al.

(10) Patent No.: US 7,276,559 B2
(45) Date of Patent: Oct. 2, 2007

(54) SOFT THERMOPLASTIC ELASTOMERS

(75) Inventors: Tonson Abraham, Strongsville, OH (US); Kuo-Shein Shen, Akron, OH (US); Norman G. Barber, Norwalk, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 404 days.

(21) Appl. No.: 11/012,753

(22) Filed: Dec. 15, 2004

(65) Prior Publication Data

US 2005/0277735 A1    Dec. 15, 2005

Related U.S. Application Data

(60) Provisional application No. 60/578,572, filed on Jun. 10, 2004.

(51) Int. Cl.
| | |
|---|---|
| C08L 23/00 | (2006.01) |
| C08L 23/04 | (2006.01) |
| C08L 9/00 | (2006.01) |

(52) U.S. Cl. .................. 525/191; 525/232; 525/240
(58) Field of Classification Search ............... 525/191, 525/232, 240
See application file for complete search history.

(56) References Cited

U.S. PATENT DOCUMENTS

| 4,220,579 A | * | 9/1980 | Rinehart | ............... 524/525 |
| 4,419,480 A | | 12/1983 | Tabar | |
| 4,607,074 A | * | 8/1986 | Hazelton et al. | ............... 524/425 |
| 6,147,160 A | | 11/2000 | Wang | |
| 6,245,856 B1 | | 6/2001 | Kaufman | |
| 6,288,171 B2 | * | 9/2001 | Finerman et al. | ............... 525/192 |
| 6,342,565 B1 | | 1/2002 | Cheng | |
| 6,444,302 B1 | | 9/2002 | Srinivas | |

FOREIGN PATENT DOCUMENTS

| EP | 0 472 946 | 11/1995 |
| EP | 0 892 831 | 5/2000 |
| WO | WO 97/39059 | * 10/1997 |

OTHER PUBLICATIONS

L. Struzik, et al. Versitile New Soft Polyolefin for Compounding With Other Soft Thermoplastics Resins or as a TPV Base Resin, 3046/ANTEC 2003, pp. 3046-3050.

* cited by examiner

*Primary Examiner*—Nathan M. Nutter
(74) *Attorney, Agent, or Firm*—Kevin M. Faulkner; Shawn H. Foster

(57) ABSTRACT

This invention relates to a soft thermoplastic vulcanizate composition comprising: a) from about 2-10 wt %, based upon total polymer content weight a)+b)+c), of a thermoplastic polyethylene or polypropylene homopolymer, or ethylene-propylene copolymer, or copolymer that includes ethylene or propylene together with one or more $C_4$ to $C_{20}$ α-olefins, said thermoplastic having at least 25% crystallinity by DSC; b) from about 15 to about 36 wt. %, based upon total polymer content weight a)+b)+c), of an ethylene-α-olefin random or block copolymer thermoplastic having less than 5% crystallinity by DSC; c) from about 60 to about 80 wt. %, based upon total polymer content weight a)+b)+c), of a cross-linked elastomer; and d) from about 50 to about 65 wt %, based upon total composition weight a)+b)+c)+d), of a process oil; wherein said thermoplastic vulcanizate composition has a Shore A Hardness of less than 35. The invention compositions may also comprise from about 0 to about 40 wt. %, based upon the total composition weight, of conventional additives.

7 Claims, No Drawings

SOFT THERMOPLASTIC ELASTOMERS

This application claims the benefit of Provisional Application No. 60/578,572 filed Jun. 10, 2004.

BACKGROUND

A. Field of Inventions

This invention relates to thermoplastic elastomer compositions comprising blends of elastomers, e.g., rubber, and thermoplastic resins, the rubber being at least partially cured. In particular, the invention is directed to such thermoplastic elastomers having a Shore A hardness of less than or equal to 35.

B. Description of Related Art

Thermoplastic elastomer compositions, e.g., blends, having a cured rubber content are well known in the art, see, for example, U.S. Pat. No. 4,130,535, where a cured, e.g., vulcanized) thermoplastic elastomer, also referred to herein as a thermoplastic vulcanizate, ("TPV") is made from a polyolefin resin and an olefin rubber. The at least partially cured state of the thermoplastic elastomer is obtainable by subjecting the blend of uncured rubber and thermoplastic resin to a curing process. This process can be static or dynamic and be done by the use of known curing agents, like peroxides or phenolic resins.

A dynamically vulcanized polyolefinic thermoplastic elastomer typically consists of 1-5 micron sized crosslinked rubber particles in a continuous semi-crystalline polyolefin matrix, where the term "semicrystalline" as used herein broadly refers to materials that have crystallinity by DSC of at least 5% or above, but preferably at least 25% or above, as contrasted with materials that are "amorphous," which as used herein broadly refers to materials that have crystallinity by DSC that is less than 5%. TPV composition processability, and physical properties (such as tensile strength) within the elastomer service temperature range is considered to be due to the continuous semi-crystalline polyolefin matrix. The matrix is the relatively "hard" phase as opposed to the rubber "soft" phase. The hardness of the TPV composition depends on the amount of soft and hard phase present. Reducing the "hard" semi-crystalline polyolefin phase would increase TPV softness at the expense of decreased product processability. A lower amount of the matrix, or, if the matrix is insufficient to provide a continuous phase, can result in TPV rubber particle agglomeration which would manifest itself as a "powdery" instead of a "continuous" thermoplastic on processing, for example, by melt extrusion of the product in compounding or finishing.

Physical properties would also be lowered due to insufficient matrix "glue" that holds the crosslinked rubber particles together. Thus, desirable soft TPV compositions are not readily produced. Moreover, increased TPV rubber content alone will not afford soft TPV compositions; added process oil is necessary. TPV compositions containing excess oil will mainly swell the rubber phase and therefore reduce plastic phase volume, which will result in the already mentioned disadvantages. Also, low molecular weight rubber and/or plastic molecules that are unattached to the TPV network can render the product "sticky" in the presence of oil. Unattached plastic molecules are those not incorporated into the polyolefin crystallites and unattached rubber molecules are those that are not bound to the crosslinked rubber network. Thus, commercially viable TPV compositions with hardness below 35 Shore A are difficult to produce.

Crosslinking of the rubber phase increases TPV hardness, but TPV compositions containing a large amount of uncrosslinked rubber do not provide commercially viable soft products. The ethylene content in commercially available EPDM rubber generally varies from about 50 weight % to about 70 weight %. The incorporation of uncrosslinkable EP rubber into a TPV composition or the addition of EPDM rubber to a preformed TPV composition will not yield a suitable soft product. The uncrosslinked rubber would be compatible with the crosslinked rubber phase, and will tend to be included into this phase, and thus the previously mentioned drawbacks of a high rubber content TPV composition will not be overcome. If an excessive amount of uncrosslinked rubber is present, or if all the rubber in the polyolefinic thermoplastic elastomer is uncrosslinked, then this "soft" product would suffer the processing and property disadvantages of a continuous rubber phase as opposed to those of the desirable continuous plastic phase for the thermoplastic elastomer product.

Thermoplastic elastomers targeted to have a hardness of less than 35 Shore A are described in EP-B-0 892 831. This patent describes a blend of rubber and thermoplastic resin, the rubber being at least partially cured, comprising a) the thermoplastic resin, b) an uncured amorphous poly-α-olefin or an ethylene and $C_{3-20}$ α-olefin amorphous copolymer and c) an at least partially cured rubber, wherein the weight ratio of b) to a) plus b) is 15-75 wt. %, and where weight ratio of c) to a) plus b) plus c) is 25-75 wt. %. Additionally, "soft polyolefins" are addressed in the article "VERSATILE NEW SOFT POLYOLEFIN FOR COMPOUNDING WITH OTHER SOFT THERMOPLASTICS RESINS OR AS A TPV BASE RESIN", L. Struzik, et al. (ANTEC 2003). This soft polyolefin is described as an in-situ polyolefin that has high rubber content prepared by selection of catalyst and process technology. The soft polyolefin is taught for use where elastomeric properties are sought by either blending with other polyolefins or by a process of dynamic vulcanization of the rubber content in the soft polyolefin. The examples illustrate compositions having Share A hardness at or above about 60.

BRIEF SUMMARY

This invention relates to a soft thermoplastic vulcanizate composition comprising: a) from about 2-10 wt %, based upon total polymer content weight a)+b)+c), of a thermoplastic polyethylene or polypropylene homopolymer, or an ethylene-propylene copolymer, or a copolymer that includes ethylene or propylene, together with one or more $C_4$ to $C_{20}$ α-olefins, said thermoplastic having at least 25% crystallinity by DSC; b) from about 15 to about 36 wt. %, based upon total polymer content weight a)+b)+c), of a thermoplastic ethylene-α-olefin random or block copolymer having less than 5% crystallinity by DSC; c) from about 60 to about 80 wt. %, based upon total polymer content weight a)+b)+c), of a cross-linked elastomer; and d) from about 50 to about 65 wt %, based upon total composition weight a)+b)+c)+d), of process oil; wherein said thermoplastic vulcanizate composition has a Shore A Hardness of less than 35. The invention compositions may also comprise from about 0 to about 40 wt. %, based upon the total composition weight, of conventional additives.

DETAILED DESCRIPTION

In one or more embodiments of this invention, very soft TPV compositions, e.g., those having less than 35, or less than 30, or less than 25, or less than 20, or even less than 15 Shore A hardness, can be produced by severely limiting some or all of the "hard" semi-crystalline continuous plastic phase, and replacing at least a portion of it with a thermoplastic ethylene-α-olefin random or block copolymer that has less than 5% crystallinity by DSC (e.g., an amorphous poly-α-olefin rubber that is not compatible with the crosslinked EPDM rubber phase, or has limited compatibility therewith). In a preferred embodiment, the combination of the amorphous uncrosslinked or uncrosslinkable elastomer with the crosslinked elastomer provides a "soft" continuous phase that reduces TPV hardness. TPV hardness is further reduced by the ability of the amorphous polyolefin rubber (e.g., an elastomer with less than 5% crystallinity by DSC) to absorb, without bleed out, a limited quantity of process oil. Without being bound by theory, it is believed that the presence of sufficient entanglements (that is, "lower" molecular weight between entanglements) in the amorphous polyolefin of this invention, in comparison to that in amorphous polypropylene homopolymers, allows this polyolefin to "hold" more oil without becoming sticky, due to its increased entanglement ("virtual" crosslink) density.

The a) thermoplastic resin can be selected from thermoplastic polyolefin resins such as polyethylene and polypropylene, as homopolymers, and also copolymers of ethylene and propylene, or those with both, or either, with preferably up to 20 wt. % of one or more $C_4$ to $C_{20}$ α-olefins. The thermoplastic resin is to have an ethylene or propylene crystallinity measured with DSC (differential scanning calorimetry) of at least 25%. Such semi-crystalline polyolefins are well known in the art and are commodity products of industry. Such are typically prepared by coordination polymerization under solution, slurry or gas phase polymerization conditions, followed by finishing and packaging as pellets. Based on the total polymer content weight a)+b)+c), the a) thermoplastic may be present in an amount of from about 2 to about 10 wt. % or between 10 and 25 wt %.

The b) low crystallinity propylene-α-olefin random or block copolymer thermoplastic can be prepared by coordination polymerization as well but is preferably polymerized without the spatial coordination required to impart significant propylene crystallinity. In general these thermoplastics have a crystallinity (measured by DSC) of less than 5%; preferably the crystallinity is below 2%. This component b) can be a random, or amorphous, polyolefin composition, based on propylene and ethylene, optionally based on 1-butene or, instead of the ethylene, as polymerized monomers or comonomers. The propylene content will preferably range from about 60, and above, to about 85, but below about 90 wt. %. To be effective in the thermoplastic elastomer of the invention, component b) should have a number average molecular weight $M_n$ (determined with SEC-DV (size exclusion chromatography, coupled with a differential viscosimetry) of at least 25,000. More preferably, the $M_n$ of component b) is at least 50,000.

The component b) should be present in the thermoplastic elastomer in a (substantially) non-cured form. In case component b) is curable, the occurrence of any curing or any substantial curing should be avoided. This is especially the case in which the curative for component c) can also cure component b) (e.g., peroxide curatives). Thus when using peroxide curatives, the component b) is preferably to be added after the completion, or at least substantial completion, of the curing process of the rubber. A preformed mixture of a) and b) may also be used, again preferably for addition after substantial curing where the curing agent may adversely affect the b) component.

Mixtures of a) and b) can be prepared in situ, and can be used alone or with additional other sources of a) and/or b) so that the proportions described are met. Such a mixture is typically prepared by sequential polymerization of the monomers, preferably propylene, in a manner that an in situ blend of olefin polymers comprising one or more semicrystalline propylene polymers or copolymers, ethylene copolymers with at least some ethylene crystallinity, and at least a small proportion of random propylene copolymers are prepared. See the ANTEC paper, supra, and EP 0 472 946 A.

The relative amount of component b) towards components a)+b) is greater than 75 wt. % and less than or equal to 90 wt. %. More preferably this is between 75 and 85 wt. %. The relative amount of component b) towards components a)+b) is greater than 75 wt. %, more preferably of from greater than 75 to less than or equal to 90 wt. % and even more preferably between 75 and 85 wt. %. Components a) and b) can form separate ingredients of the thermoplastic elastomer of the invention, but can also be constituents of a blend, prepared during a polymerization process. Such a blend, also referable to as amorphous elastomeric olefin polymer, is described in EP-A-0 472 946. Such products are made, e.g., Basell Polyolefins under the trade name AdFlex® or HiFax®, marketed as flexible or soft polyolefin.

The c) cross-linked elastomer present in the thermoplastic elastomer of the present invention may be any natural or synthetic rubber which can be cured with known curatives, like peroxides, phenolic resins, maleimides or siloxane based curatives, with or without suitable co-curatives. Suitable rubbers according to the invention are essentially non-polar rubbers such as butyl rubber, halogenated rubber (like brominated and chlorinated isobutylene-isoprene rubber), styrene-butadiene rubber, butadiene-styrene-vinylpyridine rubber, natural rubber, urethane rubber, silicone rubber, ethylene/alpha-olefin (diene) rubber (EA(D)M-rubber), polyisoprene, chlorinated polyethylene, polychloroprene, chlorosulphonated polyethylene. Preference is given to ethylene/alpha-olefin/diene terpolymer (EADM) rubber and to butyl rubber. The EADM contains as the second monomer an alpha-olefin, which can be propylene, butene-1, pentene-1, hexene-1, octene-1 and the like, or a branched isomer thereof like 4-methylpentene-1, and further styrene, α-methylstyrene and the like. Also mixtures of alpha-olefins are applicable. Preference is given to propylene and/or butene-1 as the alpha-olefin. Greater preference is given to propylene; the resulting terpolymer is an ethylene/propylene/diene terpolymer (EPDM).

The third (or fourth, or higher) monomer in such an EADM or EPDM can be one or more of any conventionally used, non-conjugated, linear, branched or cyclic diolefin comonomer, such as, hexadiene-1,4, dicyclopentadiene, ethylidene norbornene, and vinyl norbornene. Ethylidene norbornene and vinyl norbornene are preferred as a diolefin monomer.

Butyl rubber, which is a suitable cross-linkable elastomer of the thermoplastic elastomer of the present invention, is typically an amorphous copolymer of one or more isoolefins having from 4 to 7 carbon atoms, particularly, isobutylene and isoprene, and one or more vinyl aromatic monomer, particularly styrene or a para-alkylstyrene, such as para-methyl-styrene. The term "butyl rubber" also comprises the halogenated form of the above-copolymers. Thermoplastic elastomers based on butyl rubber are disclosed in e.g. U.S. Pat. No. 4,130,534, EP-A-376 227, U.S. Pat. No. 5,430,118 and U.S. Pat. No. 6,255,389.

The thermoplastic elastomer comprises 65-85 wt. % of cross-linked elastomer c) per total weight of components a)+b)+c), more preferably between 70-80 wt. %.

The cross-linked elastomer c) in the thermoplastic elastomer is at least partially cured. One method for determining the degree of curing is by measuring the amount of rubber, extractable from the TPV by using a series of extraction procedures described in, e.g., U.S. Pat. No. 4,311,628. According to such a method, the component c) in the thermoplastic elastomer of the invention is generally cured to the extent that not more than 50 wt. %, preferably not more than 15 wt. % (partial curing), and even more preferred not more than 5 wt. %, of the rubber is extractable in boiling xylene or cyclohexane. The rubber is considered to be "fully cured" when not exceeding 5 wt. % extractable rubber, and can be lower than 3 or even 2 wt. %.

Conventional d) process oils are comprised in the invention in an amount of from about 50 to about 65 wt %, based upon total composition weight a)+b)+c)+d). As used herein, the term "process oil" is to be broadly construed, and includes any added oil, including "extender oils." As is well known, such oils are added to facilitate processing and to balance the overall end product properties. Rubber processing oils generally are paraffinic, naphthenic or aromatic mineral oils derived from petroleum fractions. Oils derived from coal tar and pine tar can also be utilized. Synthetic organic esters, and similar plasticizers, are suitable as well, as are the low molecular weight synthetic polyolefin oils such as α-olefinic oils, e.g., poly-1-butene processing oil. The selection and use of such oils are well known in the art of plastic and rubber compounding.

The thermoplastic elastomer may further contain conventional additives, which can be introduced into the composition in the thermoplastic resin, the rubber, or in the blend before, during or after the curing. Examples of such additives are antioxidants, antiblocking agents, antistatic agents, ultraviolet stabilizers, plasticizers (including esters), foaming agents, flame retardants and other processing aids known in the rubber compounding art. Such additives may comprise from about 0.1 to about 300 percent by weight based on the weight of rubber and thermoplastic in the final thermoplastic elastomer product. These additives are typically added in an amount of from about 0 to 40 wt % based upon the total compositions. Fillers, reinforcement, and extenders, which can be utilized, include conventional inorganics such as calcium carbonate, clays, silica, talc, titanium dioxide, carbon black, discontinuous fibers and the like. Additives, fillers or other compounds, which may interfere with the cure agents, should be added after curing reaches the desired level.

The process for preparing the thermoplastic elastomer can be any process by which a blend of an at least partially cured rubber and a thermoplastic resin can be obtained. Preference is given to a process in which the blend is made by dynamic curing (i.e. the process of mixing under high shear and curing of the rubber and the thermoplastic resin are taking place in one process step). Equipment to be used in a process according to the invention can be any mixing apparatus for blending polymers. Reference can be had to batch equipment (like Banbury mixers); preference is given to continuous operating equipment, such as an extruder, preferably a twin-screw extruder. Care should be taken that all ingredients are intensively mixed.

Preferably, the process of this invention comprises mixing the curable rubber, thermoplastic resin, crosslinking agent, and cure catalyst or accelerator using dynamic vulcanization technology (see, e.g., U.S. Pat. No. 4,594,390 and U.S. Pat. Pat. No. 6,147,160). The "dynamic vulcanization" means vulcanization or curing process for a rubber blended with thermoplastic resin, wherein the rubber is vulcanized under conditions of shear at a temperature sufficient for the mixture to flow. The rubber is thus simultaneously crosslinked and dispersed as micron-size particles within the thermoplastic resin. Depending on the degree of cure, rubber to plastic ratio, compatibility, type (kneader choice) and intensity of mixing (shear rate), other morphologies such as co continuous rubber phase in plastic matrix are possible. The mixing and shear rate in the dynamic vulcanization can be accomplished by use of many available plastic and rubber compounding equipment known in the art. The type and intensity of mixing, temperature, and residence time required for dynamic vulcanization can be achieved by the choice of one of the above machines in combination with the selection of kneading or mixing elements, screw design, and screw speed (typically <3000 RPM).

The products of the present invention are useful for making a variety of molded articles like hoses, containers and solid consumer objects. These articles can be made by extrusion, injection or compression molding techniques. They are especially useful in those type of applications where the improved properties of the TPV are of excellent use, like in low-hardness applications ("soft-touch" applications) where the products can replace soft PVC, or where the reduced fogging and oil-swell are of interest. Examples of such applications can be speaker cones, seals, tubings, medical containers, consumer good handling pads, and the like.

The thermoplastic vulcanizates of the invention are also very suited to prepare elastic fibers. These fibers have a titer of 1-1000 tex, preferably between 2 and 500 tex and most preferred between 5 and 250 tex. (a "tex" being the weight (in grams) of 1000 meters of fiber (g/1000 m)). The elongation at break amounts at least 100% and can be as high as 400% or even 600%. The fibers are suitable to give elastic properties to textile materials, fabrics and knittings. The fibers can also be used in combination with other fibers, like polyamide or cotton fibers. The fiber can be prepared by a melt spinning process of the thermoplastic elastomer of the present invention. The equipment suitable for such a process is known to those skilled in the art and comprises at least a unit containing the molten thermoplastic elastomer and a spinneret having one or more openings to form the fibers from the molten thermoplastic elastomer. The equipment to produce the thermoplastic elastomer and the equipment to produce the fibers there from can be integrated in one apparatus, like in an extruder provided at its exit with a spinneret.

The thermoplastic elastomer of the present invention has unexpectedly improved properties compared to conventional TPV's having a same content of at least partially cured rubber. Blow moldability, the tension set and the foamability are all improved at least to some extent. The invention is exemplified by the following examples and comparative experiments.

EXAMPLES

Soft thermoplastic elastomers were prepared from soft plastic HiFax® 7334 of Basell Polyolefins and two different EPDM rubbers. HiFax consists of 84 wt % of amorphous component (b) and 16 wt % of crystalline component (a) (see Table 2), and is an in situ polymerized reactor product. The thermoplastic elastomer product was prepared in a dynamic vulcanization process using an extruder mixer (giving the TPV). Phenolic resin Table 1, Ex. 3) and hydrosilation (Table 1, Ex. 1, 2, 4) cure chemistry was utilized in the dynamic vulcanization process. More specifically, rubber blends consisting of granulated rubber, clay, and the appropriate inorganic solids were fed to a 53 mm twin-screw extruder (TSE). Also fed to the TSE was the appropriate amount of plastic material as per the formulations of Table 1, so that the total material to the TSE feed port was about 70 kg/hr.

The blend was then intensively mixed (shear rate >100 s$^{-1}$) in the initial section of the extruder so as to melt the plastic (by shear heating and external heat applied via the extruder barrel) and form an intimate blend of the feed materials (thermoplastic olefin blend, TPO). Half of the required process oil was piped in through the initial barrel sections so as to be incorporated into and to facilitate TPO homogenization. Material residence time in the extruder TPO zone was about 2 min.

After venting of volatiles from the TPO, the rubber curative (silicone hydride/platinum or phenolic resin) was fed into the extruder to commence dynamic vulcanization. After a residence time of about 2 min in the curing zone, the remainder of the process oil required by the formulation was added to the TPV melt through the extruder barrel. The finished product melt stream was cooled and pelletized using an underwater pelletizer. During the TPV production process, the melt temperatures varied from 180° C. to 240° C., the higher melt temperatures being recorded in the curing zone. The pelletized product was injection molded to produce plaques for physical property testing.

Compound formulation and results are listed in Table 1, characterization of the raw materials of Table 1 is presented in Table 2, and results from relevant prior art are in Table 3.

TABLE 1

INJECTION MOLDED SOFT TPVS

| | Example | | | |
|---|---|---|---|---|
| | 1 | 2 | 3 | 4 (Control) |
| Ethylene/propylene/vinyl norbornene | 200 | 200 | — | 200 |
| Ethylene/propylene/ethylidene norbornene | — | — | 175 | — |
| Clay | 42.0 | 42.0 | 42.0 | 42.0 |
| Paraffinic Oil | 128.1 | 120.1 | 153 | 128.1 |
| Isotactic Polypropylene Homopolymer (1.0 MFR) | — | — | — | 31.0 |
| Silicone Hydride Crosslinker 7.0 mmol/g SiH | 2.0 | 2.0 | — | 2.0 |
| Pt (0.05 mg/g in oil) | 1.90 | 1.90 | — | 1.90 |
| SP 1045 (Phenolic Resin Curative) | — | — | 6.0 | — |
| SnCl$_2$ | — | — | 1.26 | — |
| ZnO | 2.0 | 2.0 | 2.0 | — |
| Hifax 7334 | 25.0 | 25.0 | 40.0 | — |
| Hardness (Shore A) | 16 | 17 | 24 | 35 |
| Ultimate Tensile Strength (MPa) | 1.58 | 1.79 | 1.94 | 3.1 |
| Ultimate Elongation (%) | 320 | 319 | 196 | 450 |
| Modulus at 100% (MPa) | 0.4 | 0.45 | 0.48 | 1.0 |
| Compression Set (%) (22 hrs @ 70° C.) | 33 | 32 | 25 | 25 |
| Tension Set (%) | 2 | 2 | 2 | |
| Tear C (kN/m) | 4.6 | 4.6 | 5.0 | 12 |

TABLE 2

INGREDIENTS

Ethylene/propylene/vinyl norbornene rubber (63 wt % ethylene, 0.7 wt % vinyl norbornene) with 100 parts paraffinic oil
Ethylene/propylene/ethylidene norbornene rubber (64 wt % ethylene, 4.5 wt % ethylidene norbornene) with 75 parts paraffinic oil
SP 1045 - Phenolic resin curative for EPDM rubber - supplied by Schenectady Corp.
HiFax 7334 - Basell HiFax 7334 Composition (TREF, GPC, NMR, DSC, X-RAY)
73 wt % Ethylene/propylene rubber (26 wt % E, Mw = 367 K, Mn = 66.6 K)
11 wt % Ethylene/propylene rubber (32 wt % E, Mw = 377 K, Mn = 52.5 K)
3 wt % Ethylene/propylene (4 wt % propylene)
2.4 wt % Ethylene/propylene (7 wt % propylene)
7.0 wt % random PP (3 wt % E, m.p. 148° C.)
3.6 wt % random PP (6 wt % E)

TABLE 3

Prior Art
EP 0 892 831

| | |
|---|---|
| EP (ENB) DM | 100 |
| Isotactic Polypropylene Homopolymer (1.2 MFR) | 12.6 |
| Amorphous Ethylene/propylene Copolymer (unidentified composition) | 29.4 |
| Talc | 40.0 |
| SP 1045 | 3.00 |
| SnCl$_2$ 2H$_2$O | 3.00 |
| ZnO | 1.80 |
| Phenolic Antioxidant | 0.90 |
| Extender Oil | 164 |
| Hardness (Shore A) | 22 |
| Ultimate Tensile Strength (MPa) | 1.1 |
| Ultimate Elongation (%) | 290 |
| Modulus at 100% (MPa) | 0.5 |
| Compression Set (%) (22 hrs @ 70° C.) | 35 |

The limitations in producing a soft (<35 Shore A in hardness) thermoplastic vulcanizate (TPV) by decreasing the product plastic content (and thereby increasing rubber content) have been described. Moreover, conventional thermoset EPDM, even when oil extended, is relatively hard. For example, thermoset rubber produced from the EP (VNB) DM (50% oil content) listed in the examples illustrating this invention, has a hardness of 32 Shore A. The presence of a plastic phase in a TPV containing said rubber would further increase hardness. Hence, high oil extension of the rubber would typically be required for the preparation of soft TPV's, which can sometimes lead to oil bleed from the product.

The amorphous polymers (b) of this invention form a "soft" plastic capacity (as described earlier), and therefore can prevent oil bleed by reducing the need for oil in the TPV. Moreover, better absorption of oil by this "soft" plastic allows greater softness without bleed. The example of the softest TPV disclosed in EP 0 892 831 has a hardness of 22 Shore A. This formulation contains 164 parts of oil per 100 parts of "dry" rubber, with 12.6 parts of the crystalline plastic component, and 29.4 parts of the amorphous plastic component, for a total 42 parts of plastic. In the present invention, TPV oil content could be increased and plastic content decreased over the prior art, thereby allowing the production of invention soft TPVs.

A product with 16 Shore A hardness would be produced by the use of 230 parts of oil per 100 parts of rubber, with the total crystalline and amorphous plastic component being 25 parts. Note also that the soft TPVs disclosed in the examples of the present invention have higher tensile strength than the harder TPVs of EP 0 892 831.

What is claimed is:

1. A thermoplastic vulcanizate composition comprising:
   a) from about 2-10 wt %, based upon total polymer content weight a)+b)+c), of a thermoplastic polyethylene or polypropylene homopolymer, or ethylene-propylene copolymer, or copolymer that includes ethylene or propylene together with one or more $C_4$ to $C_{20}$ α-olefins, said thermoplastic having at least 25% crystallinity by DSC;
   b) from about 15 to about 36 wt. %, based upon total polymer content weight a)+b)+c), of a thermoplastic ethylene-α-olefin random or block copolymer having less than 5% crystallinity by DSC;
   c) from about 60 to about 80 wt %, based upon total polymer content weight a)+b)+c), of a cross-linked elastomer; and
   d) from about 50 to about 65 wt %, based upon total composition weight a)+b)+c)+d), of a process oil;

wherein said thermoplastic vulcanizate composition has a Shore A Hardness of less than 35 and wherein the relative amount of b) to a)+b) is greater than 75 wt % and less than or equal to 90 wt. %.

2. The composition of claim 1, wherein the thermoplastic ethylene-α-olefin random or block copolymer has a number-average molecular weight ($M_n$) of at least 25,000.

3. The composition of claim 1, wherein the cross-linked elastomer is selected from the group of EADM and butyl rubber.

4. The composition of claim 1, wherein not more than 5% of the cross-linked elastomer is extractable.

5. A molded article comprising the thermoplastic vulcanizate of claim 1.

6. The composition of claim 1 wherein the relative amount of b) to a) is from about 80 wt. % to less than or equal to 90 wt. %.

7. The composition of claim 1 wherein the relative amount of b) to a) is from about 84 wt. % to less than or equal to 90 wt. %.

* * * * *